United States Patent
Bouzit-Benbernou

(10) Patent No.: US 10,643,172 B2
(45) Date of Patent: *May 5, 2020

(54) HYBRID SECURE LOCKER SYSTEM FOR MAILING, DEPOSITION AND RETRIEVAL OF SHIPMENTS

(71) Applicant: NEOPOST TECHNOLOGIES, Bagneux (FR)

(72) Inventor: Samira Bouzit-Benbernou, Chatenay-Malabry (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 791 days.

This patent is subject to a terminal disclaimer.

(21) Appl. No.: 14/590,539

(22) Filed: Jan. 6, 2015

(65) Prior Publication Data

US 2015/0193733 A1   Jul. 9, 2015

(30) Foreign Application Priority Data

Jan. 6, 2014 (EP) .................................... 14305011

(51) Int. Cl.
*G06Q 10/08* (2012.01)
*A47G 29/14* (2006.01)
(Continued)

(52) U.S. Cl.
CPC ....... *G06Q 10/0836* (2013.01); *A47G 29/141* (2013.01); *G06Q 10/08* (2013.01); *G06Q 10/0832* (2013.01); *G06Q 50/28* (2013.01); *G06Q 50/32* (2013.01); *G07B 17/00193* (2013.01); *G07F 17/12* (2013.01);
(Continued)

(58) Field of Classification Search
None
See application file for complete search history.

(56) References Cited

U.S. PATENT DOCUMENTS 4,836,352 A     6/1989  Tateno et al.
5,974,111 A  *  10/1999 Krug ..................... G01N 23/20
                                                    378/53
(Continued)

FOREIGN PATENT DOCUMENTS

CN       201833357 U    5/2011
FR       2 851 360 A1   8/2004
(Continued)

OTHER PUBLICATIONS

Home Delivery vs Parcel Lockers: an economic and environmental assessment, Maria Giuffrida, 2012, p. 1-2 (Year: 2012).*
(Continued)

*Primary Examiner* — George Chen
*Assistant Examiner* — Ibrahim N El-Bathy
(74) *Attorney, Agent, or Firm* — Cozen O'Connor

(57) ABSTRACT

A hybrid system for securely controlling deposition and retrieval of shipments, including a managing distribution centre, at least one electronic locker unit connected to the managing distribution centre through a communication network, and having a control desk and several lockable compartments of different sizes, wherein the electronic locker unit comprises a shape measurement module located inside each compartment for acquiring the shipment content's shape.

20 Claims, 6 Drawing Sheets

(51) Int. Cl.
*G07F 17/12* (2006.01)
*G06Q 50/32* (2012.01)
*G07B 17/00* (2006.01)
*G06Q 50/28* (2012.01)
*G01N 21/3581* (2014.01)
*A47G 29/122* (2006.01)

(52) U.S. Cl.
CPC ........... *A47G 2029/1221* (2013.01); *A47G 2029/145* (2013.01); *A47G 2029/149* (2013.01); *G01N 21/3581* (2013.01); *G07B 2017/00153* (2013.01); *G07B 2017/00209* (2013.01); *G07B 2017/00233* (2013.01); *G07B 2017/00685* (2013.01); *G07B 2017/00701* (2013.01)

(56) References Cited

U.S. PATENT DOCUMENTS

| | | | |
|---|---|---|---|
| 6,323,782 | B1 | 11/2001 | Stephens et al. |
| 6,707,381 | B1* | 3/2004 | Maloney ............ G07C 9/00103 340/568.1 |
| 6,895,241 | B2 | 5/2005 | Hara |
| 2002/0080030 | A1* | 6/2002 | Inomata ................ G07F 17/12 340/542 |
| 2003/0138147 | A1* | 7/2003 | Ongkojoyo .............. G06K 9/00 382/224 |
| 2004/0076544 | A1 | 4/2004 | Dao |
| 2005/0068178 | A1* | 3/2005 | Lee ....................... G06Q 10/08 340/569 |
| 2005/0264422 | A1 | 12/2005 | Watanabe et al. |
| 2006/0043298 | A1* | 3/2006 | Kawase ............ G01N 21/3581 250/339.06 |
| 2006/0054824 | A1 | 3/2006 | Federici et al. |
| 2006/0098842 | A1 | 5/2006 | Levine |
| 2006/0152339 | A1* | 7/2006 | Mercier ............... G07G 1/0054 340/5.73 |
| 2007/0145973 | A1 | 6/2007 | Bertozzi et al. |
| 2009/0119232 | A1* | 5/2009 | Mercier .......... G07B 17/00193 705/407 |
| 2009/0285353 | A1* | 11/2009 | Ellenbogen ............ G01V 5/005 378/9 |
| 2011/0174551 | A1 | 7/2011 | Lucas et al. |
| 2011/0288685 | A1* | 11/2011 | Usem .................... G07F 17/12 700/275 |
| 2012/0194043 | A1 | 8/2012 | Turner et al. |
| 2012/0211397 | A1 | 8/2012 | Kilian |
| 2012/0326840 | A1 | 12/2012 | Frankenberg et al. |
| 2013/0119129 | A1 | 5/2013 | Amdahl et al. |
| 2013/0248425 | A1 | 9/2013 | Kunnen |
| 2013/0261792 | A1* | 10/2013 | Gupta .................... G06Q 10/08 700/232 |
| 2013/0274013 | A1* | 10/2013 | Boncyk .................. G06K 9/228 463/31 |
| 2014/0035721 | A1 | 2/2014 | Heppe et al. |
| 2015/0077221 | A1* | 3/2015 | Peters .................... G07F 17/00 340/5.28 |
| 2015/0112887 | A1 | 4/2015 | Camp |
| 2015/0193732 | A1 | 7/2015 | Bouzit-Benbernou |
| 2016/0294601 | A1 | 10/2016 | Frederick |
| 2017/0193258 | A1 | 7/2017 | Venture et al. |
| 2017/0220828 | A1 | 8/2017 | Venture et al. |

FOREIGN PATENT DOCUMENTS

| | | |
|---|---|---|
| WO | 2004/064581 A1 | 8/2004 |
| WO | 2006/050412 A1 | 5/2006 |
| WO | 2013/170316 A1 | 11/2013 |

OTHER PUBLICATIONS

European Search Report of EP 14 30 5011 dated Mar. 14, 2014.
European Search Report, dated Mar. 17, 2014, for European Application No. 14 30 5012, 2 pages.
Extended European Search Report, dated Jul. 20, 2017, for European Application No. 17305016.2-1806, 6 pages.
Extended European Search Report, dated Jun. 23, 2016, for European Application No. 16305010.7-1806, 6 pages.
Extended European Search Report, dated Mar. 28, 2014, for European Application No. 14305011.0-1953, 8 pages.
Extended European Search Report, dated Nov. 28, 2014, for European Application No. 14305012.8-1953, 9 pages.
Extended European Search Report, dated Oct. 15, 2014, for European Application No. 14305012.8-1953, 9 pages.
Partial European Search Report, dated Apr. 11, 2014, for European Application No. 14305012.8-1953, 6 pages.
Venture et al., "Automated Autovalidating Locker System," U.S. Appl. No. 15/863,633, filed Jan. 5, 2018, 43 pages.

* cited by examiner

HYBRID SECURE LOCKER SYSTEM FOR MAILING, DEPOSITION AND RETRIEVAL OF SHIPMENTS

TECHNICAL FIELD

The present invention relates to the field of communication, tracking and control of mailing, transportation, delivery and receipt of shipments, and in particular a method and system for depositing shipments into an electronic locker system comprising several lockable compartments, and for collecting or retrieving these shipments thereafter.

BACKGROUND

There are many references in prior art on electronic locker systems used for depositing, storing, picking up or mailing various kinds of shipments such as parcels or packages.

EP 1 587 401 discloses a method for depositing mail by a deliverer of mail in an electronic locker system provided with several lockable compartments. The method is characterized in that a controller of the locker system causes one or several compartments to open in order to deposit mail and at least one new compartment opens automatically when a compartment is closed and when detecting means of the locker system have detected information allocated prior to sending.

U.S. Pat. No. 6,895,241 describes a door-lock-opening method for a home delivery locker which includes a home delivery locker and a managing company that are connected to each other through a line, the managing company controlling depositing and taking-out processes of the home delivery locker; a person who wishes to take out a parcel addressed to the person from the home delivery locker is allowed to communicate with the managing company through a mobile terminal such as a mobile telephone, and in the case when the company has confirmed that the person who made contact therewith is a registered user of the home delivery locker, the company releases the lock of the door of the home delivery locker housing the parcel.

U.S. Pat. No. 6,323,782 relates to a controlled access storage system for the delivery and retrieval of an item having a transponder associated therewith. In this regard, the transponder is programmed with data specific to the item. The transponder is configured to transmit item identification data. The storage system is provided with an enclosure sized and configured to store the item. The storage system is further provided with a locking mechanism for unlocking the enclosure for access therein in response to an unlock signal. The storage system is further provided with a transponder communications device which is configured to electrically interrogate the transponder and to receive the item identification data in response. The storage system is further provided with access control circuitry which is disposed in operable communication with the transponder communications device and the locking mechanism, for selectively providing an unlock signal to the locking mechanism in response to the received item identification data.

Though all the previous locker systems generally prove satisfactory, improvements in the delivery process of packages and transportable items in general always remain a recurrent topic of close attention. Errors often happen at any stage of the shipment process, from the delivery centre to the delivery point. With the growth of internet particular-to-particular corporations, there are furthermore few means of sending shipments outside of business hours. Enhancing the quality of both service and security regarding the delivery and shipping processes therefore continues to be highly desirable.

OBJECT AND DEFINITION OF THE INVENTION

It is therefore an object of the invention to provide an improved locker method and system which facilitate and secure the deposit and pickup of shipments, and allow their secure mailing in a 24/7 operating mode.

Another object of the invention consists in proposing such a locker system that is simple to implement, user-friendly, not too expensive, and the technical adjustments of which do not impact its architecture.

According to a first aspect of the invention, these objects are achieved through the provision of a method for securely controlling mailing, deposition and retrieval of shipments into at least one electronic locker unit connected to a managing distribution centre through a communication network and having several lockable compartments of different sizes, comprising the following steps:

generating an identification code of the shipment and specific information associated with the shipment;

opening a compartment of said at least one electronic locker unit;

depositing the shipment inside the compartment;

acquiring the shipment content's shape with a shape measurement module located inside the compartment; and adding the content's shape to the specific information and recording the specific information in a locker unit database.

Preferably, the specific information includes the three dimensions and/or the weight of the shipment and advantageously indicating to a sender at least one appropriate compartment according to the three dimensions and/or the weight of the shipment.

Advantageously, the specific information may be generated on a computer of the sender or directly at a control desk of the electronic locker unit and preferably the specific information is sent to a remote database accessible by the electronic locker unit.

According to another aspect of the invention, the method further comprises measuring the dimensions of the shipment by a three-dimensional measuring device located within said control desk of the electronic locker unit.

According to yet another aspect of the invention, the method further comprises weighing the shipment with a built-in scale located within said control desk of the electronic locker unit.

According to still another aspect of the invention, the identification code is printed as a barcode or included in a RFID tag which is affixed to the shipment.

According to still yet another aspect of the invention, the method further comprises securely paying postage and services fees for franking the shipment at a control desk of the electronic locker unit.

In an alternative embodiment, the invention relates to a method for securely controlling deposition and retrieval of shipments on at least one electronic locker unit connected to a managing distribution centre through a communication network, and having several lockable compartments of different sizes, comprising the followings steps:

entering an identification code of the shipment and retrieving specific information associated with the shipment;

opening a compartment of said at least one electronic locker unit;

depositing the shipment inside the compartment;

acquiring the shipment content's shape with a shape measurement module located inside the compartment and comparing in a processing module the acquired shipment content's shape with the shipment content's shape included within the specific information;

locking the compartment containing the shipment; and logging the compartment as being filled and locked upon close match and validation of comparison of the shipment content's shape.

Preferably, the method further comprises notifying the managing distribution centre of the safe deposition and/or retrieval of the shipment with an electronic message linked to the identification code of the shipment.

In the two embodiments, the acquired shipment content's shape can be compared to hazardous items listed in a surveillance bank of pictures, the compartment containing the shipment is locked and logged as being successfully filled and the shipment is logged as being ready for retrieval if no one of such hazardous items is identifiable. If at least one of such items is identifiable, an error message is preferably sent at a control desk of the electronic locker unit.

The invention also concerns a hybrid system for securely controlling mailing, deposition and retrieval of shipments, comprising:

a managing distribution centre;

at least one electronic locker unit connected to the managing distribution centre through a communication network, and having a control desk and several lockable compartments of different sizes;

wherein said at least one electronic locker unit comprises:

a shape measurement module located inside each compartment for acquiring the shipment content's shape.

Advantageously, said electronic locker further includes a processing module for comparing the acquired shipment content's shape with hazardous items listed in a bank of pictures.

Preferably, said electronic locker unit further includes a weighing module inside each compartment for weighing the shipment, the processing module comparing the measured weight with a corresponding recorded weight.

Additionally, said electronic locker comprises a three-dimensional measuring device located on said control desk for measuring the dimensions of the shipment and a built-in scale located on said control desk for measuring the weight of the shipment.

This simple arrangement allows implementing both delivery and shipping functions within a single locker unit which becomes really more convenient. Moreover, the 3D measurement of the shipment and the determination of the shape of its content constitute a true uncommon advantage, in particular in the security field.

Without requiring a high degree of precision and accuracy, the innovative combination of approximate weight and shape of a shipment's content provides a valid indication or recognition of a true item for delivery.

Preferably, said shape measurement module comprises a terahertz vision device mounted on a ceiling of compartment for covering any shipment resting on an upper bearing plate.

BRIEF DESCRIPTION OF DRAWINGS

The invention can be better understood in reading the following detailed description accompanied by illustrative and non-limiting examples with reference to the drawings, in which.

DETAILED DESCRIPTION OF PREFERRED EMBODIMENT

Figure 1:
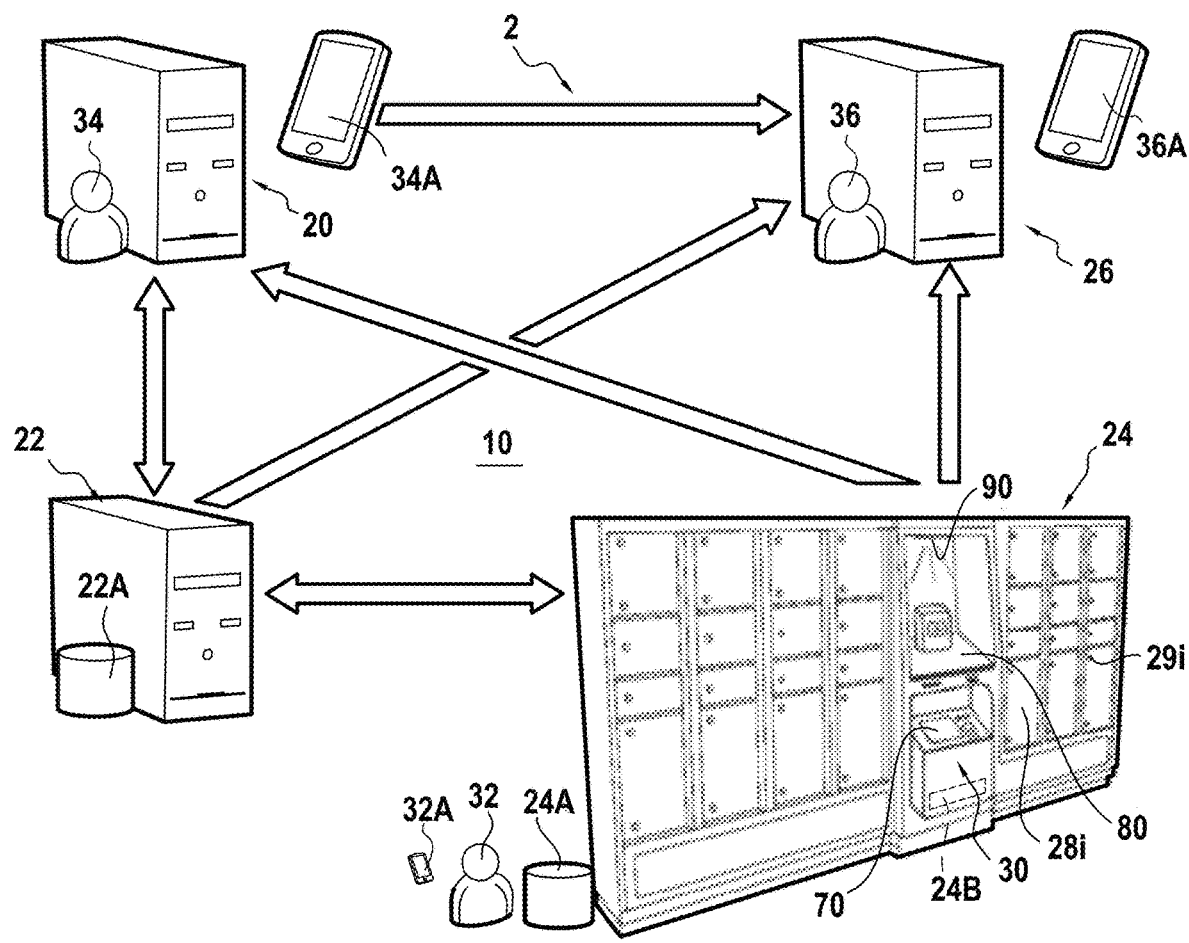
FIG. 1 schematically shows the secure locker system of the invention.
Figure 2:
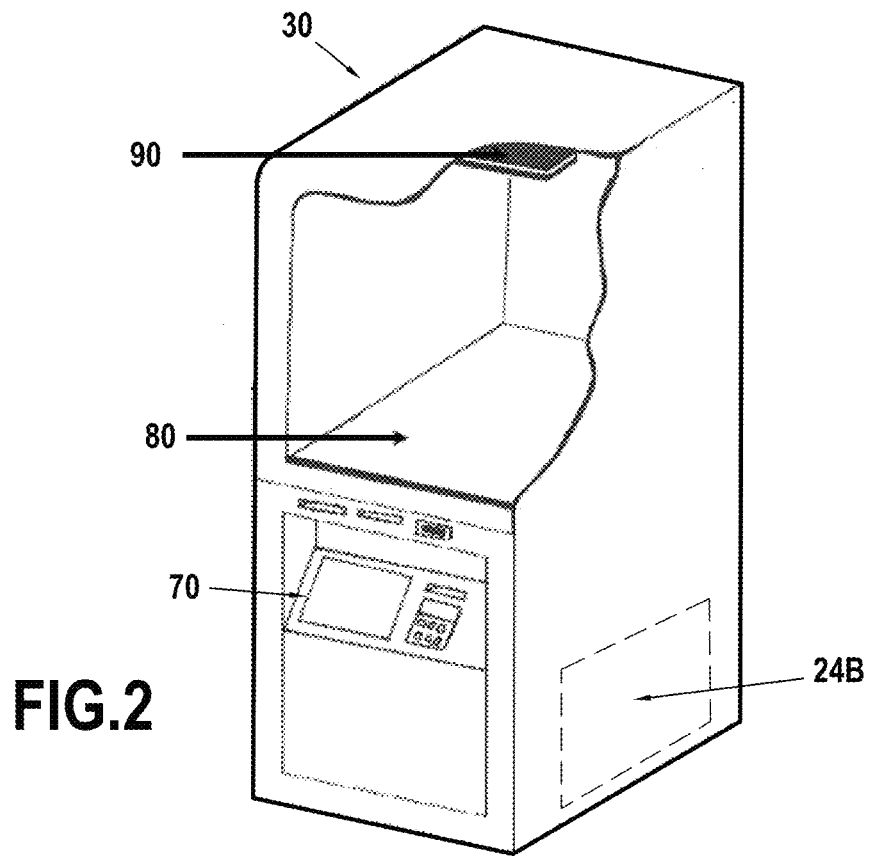
FIG. 2 is a perspective view of a control desk of an electronic locker unit in accordance with the invention.

In a preferred embodiment of the invention, a secure locker system 2 as shown on FIG. 1 and FIG. 2 comprises a communication network 10 linking at least a sender computer 20, a managing distribution centre 22 with its managing distribution database 22A, at least an electronic locker unit 24 with its locker unit database 24A and processing module 24B, and at least a recipient computer 26. The secure locker system is generally controlled by computer means, electronic means and mechanical means for operating the electronic locker unit through all its input and output means. As an alternative embodiment, the managing distribution database and the locker unit database can be implemented in a remote database (for instance a cloud database not shown) accessible by the managing distribution center and the electronic locker unit.

The electronic locker unit comprises a series of available compartments 28i of different sizes and a control desk 30 accessible for a delivery agent or an user and including processing module 24B, a set 70 of monitor, keyboard, printer, scanner and card reader, a built-in postal scale 80 and an embedded 3D scanning sensor module 90. Each compartment comprises an automatic door and can support an indicating luminous sign 29i. The bottom of the electronic locker unit preferably comprises compartments of larger size assigned to heavy or bulky shipments.

Figure 3:
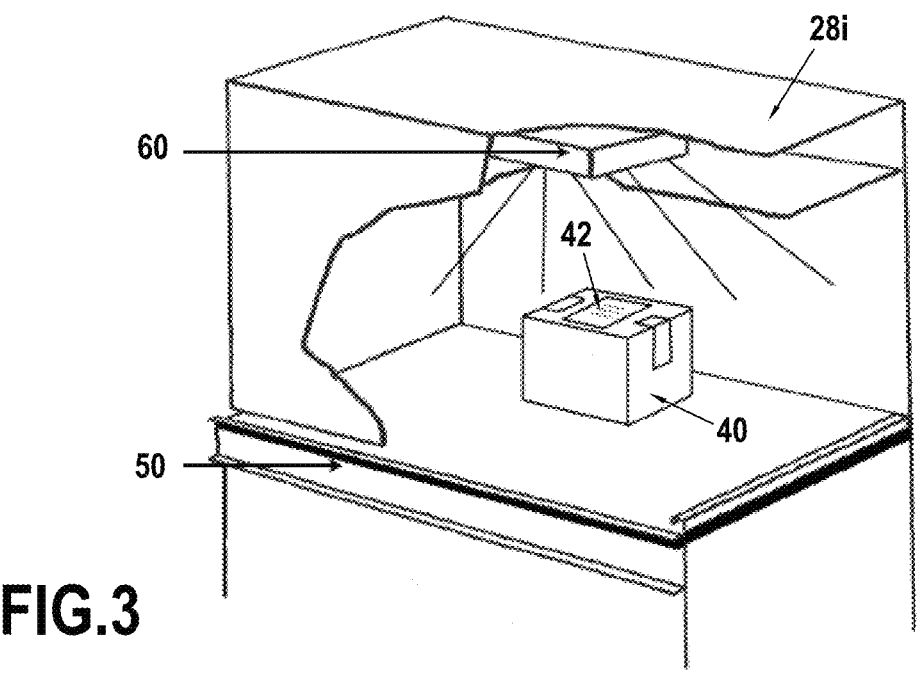
FIG. 3 is a perspective view of a compartment of an electronic locker unit of the invention.
Figure 4A:
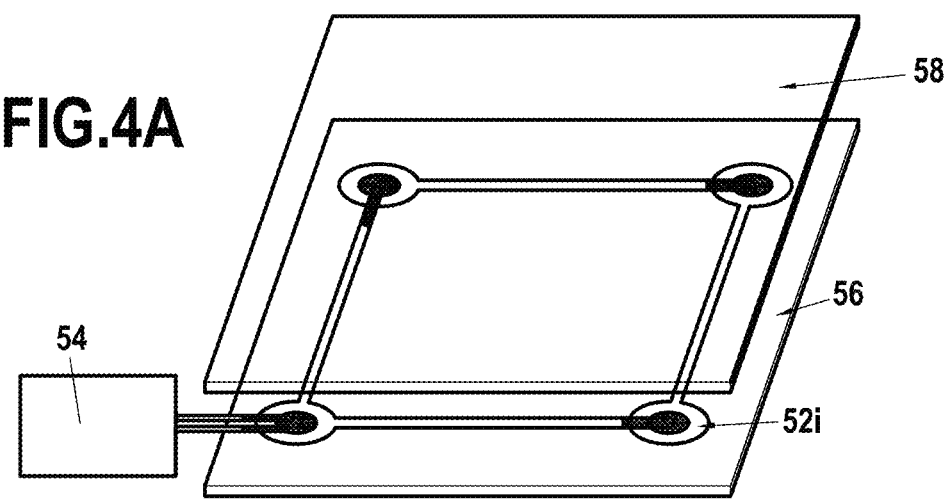
FIG. 4A and FIG. 4B are schematic top and side views of weighing means associated with the compartment of FIG. 3.
Figure 4B:
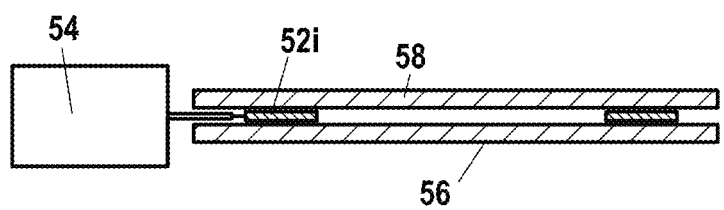

As suggested on FIGS. 1 and 3, for tracking purposes, the parcel bears a standard identification means 42 of any kind such as a barcode (or other type of codes) and/or a RFID tag. Each compartment comprises a weighing module 50 and a shape measurement module 60. On FIGS. 4A and 4B, each weighing module comprises a series of thin flexible force sensors 52i linked together to a circuit board 54, attached to a lower base 56, and located under an upper bearing plate 58.

Figure 5:
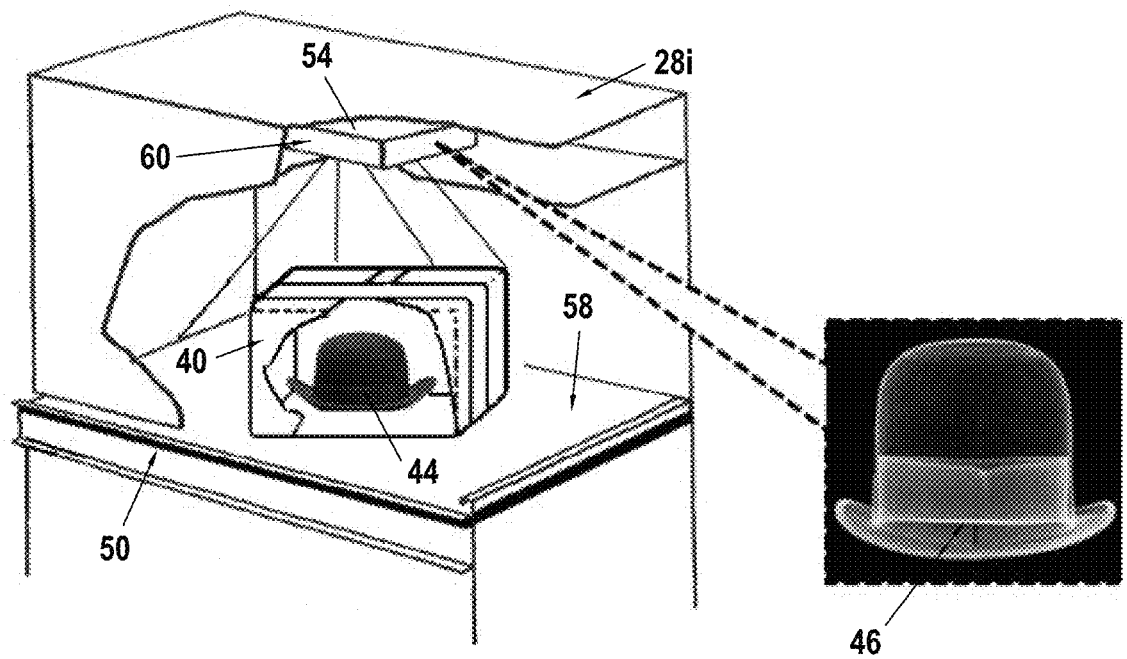
FIG. 5 is similar to FIG. 3 and illustrates the shape measurement module of the invention mounted inside the compartment.

As shown on FIG. 5, the shape measurement module 60 is mounted on the ceiling of the compartment for covering any shipment resting on the upper bearing plate 58. A "through objects vision" technology such as a combination of CMOS and a microchip that discerns a terahertz band of the electromagnetic spectrum (terahertz vision device), allows detecting the shape of the content 44 inside the shipment 40, and generating a form picture 46.

The hybrid secure locker system operates as follows in accordance with complementary flow charts of FIG. 6 to FIG. 8.

Current electronic locker units do not provide means for shipping parcels. Sender typically opts therefore for a public or private carrier or a self-service kiosk. With the hybrid secure locker system of the invention, the sender can from now on conveniently collect and/or ship parcels in the same locker compartments, according to the two following operating modes.

In the Shipping Operating Mode

Figure 6:
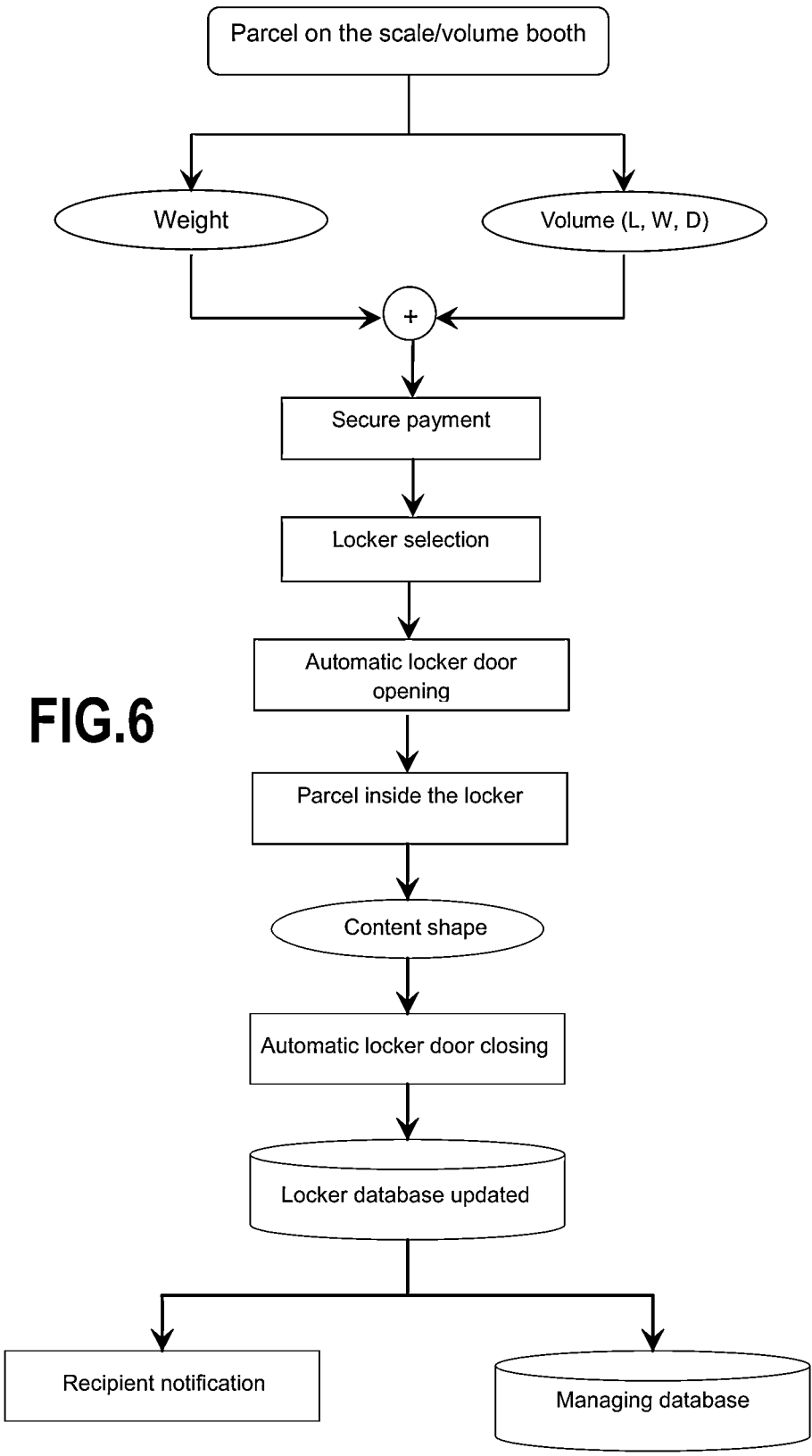
FIG. 6 to FIG. 8 are complementary flow charts which illustrate the successive operating steps of two respective operating modes (shipping and delivery) of the locker control method according to the invention.

As clearly expressed on FIG. 6, sender 20 puts shipment (parcel 40) on the built-in scale 80 of control desk 30 and follows the instructions displayed on its monitor. The parcel is weighed while its dimensions are instantly measured by embedded 3D scanning sensor module 90. The sender then selects the mailing service, fills in required shipping information including addresses of the sender and recipient, and the mobile phone number and email address of the sender. He/she goes through the payment process and a receipt is printed out. All this information (weight, dimensions, etc . . . ) are recorded in the locker unit database 24A and preferably in the managing distribution database 22A too.

The identification code 42 is printed at the control desk as a barcode on a postal sticker or included in a RFID tag, and affixed to the parcel 40 by the sender.

Alternatively, the dimensions and the weight of the shipment, and all required shipping information may be entered on the computer of the sender. The payment process may also be performed in advance on the computer of the sender. In this case the identification code 42 may also be provided in the form of a password, which is entered at the control desk, causing a label carrying the barcode (and/or RFID tag) to be issued.

At least one luminous sign 29i is lighted for suggesting at least an appropriate compartment according to the parcel size and weight. Alternatively, the global image of the electronic locker unit with the suggested available compartments highlighted is displayed on the monitor. If the parcel is really heavy, compartments located close to the ground are favored for an easier lifting. The sender then confirms the selection and the relevant compartment is automatically opened. The sender puts the parcel inside the chosen compartment.

The shape measurement module 60 mounted on the ceiling of the compartment acquires via the "through objects vision" technology the shape of the content 44 inside the shipment 40, and generates a form picture 46. The content's shape is compared to hazardous items listed in a surveillance bank of pictures for sending a warning message if at least one of such items is identifiable.

If the content's shape is not considered as hazardous (i.e. no one of such hazardous items is identifiable), the compartment is locked (securely closed) and logged as being successfully filled and the shipment is logged as being ready for retrieval.

Additionally, the weighing module 50 of the compartment measures the weight of the shipment. The measured weight is compared to the corresponding information associated to the shipment before locking the compartment and upon close match and validation of the comparison of the weight logging it as successfully filled.

Otherwise, an error message will pop up on the display of the electronic locker unit. Simultaneously, the managing distribution centre is notified. The shipment is either retained or returned to the managing distribution centre for further verification.

The managing distribution database 22A and the locker unit database 24A are automatically updated. Optionally the sender 34 and the recipient 36 may also be automatically notified directly, for instance on their portable phone 34A, 36A.

In the Delivery Operating Mode

Figure 7:
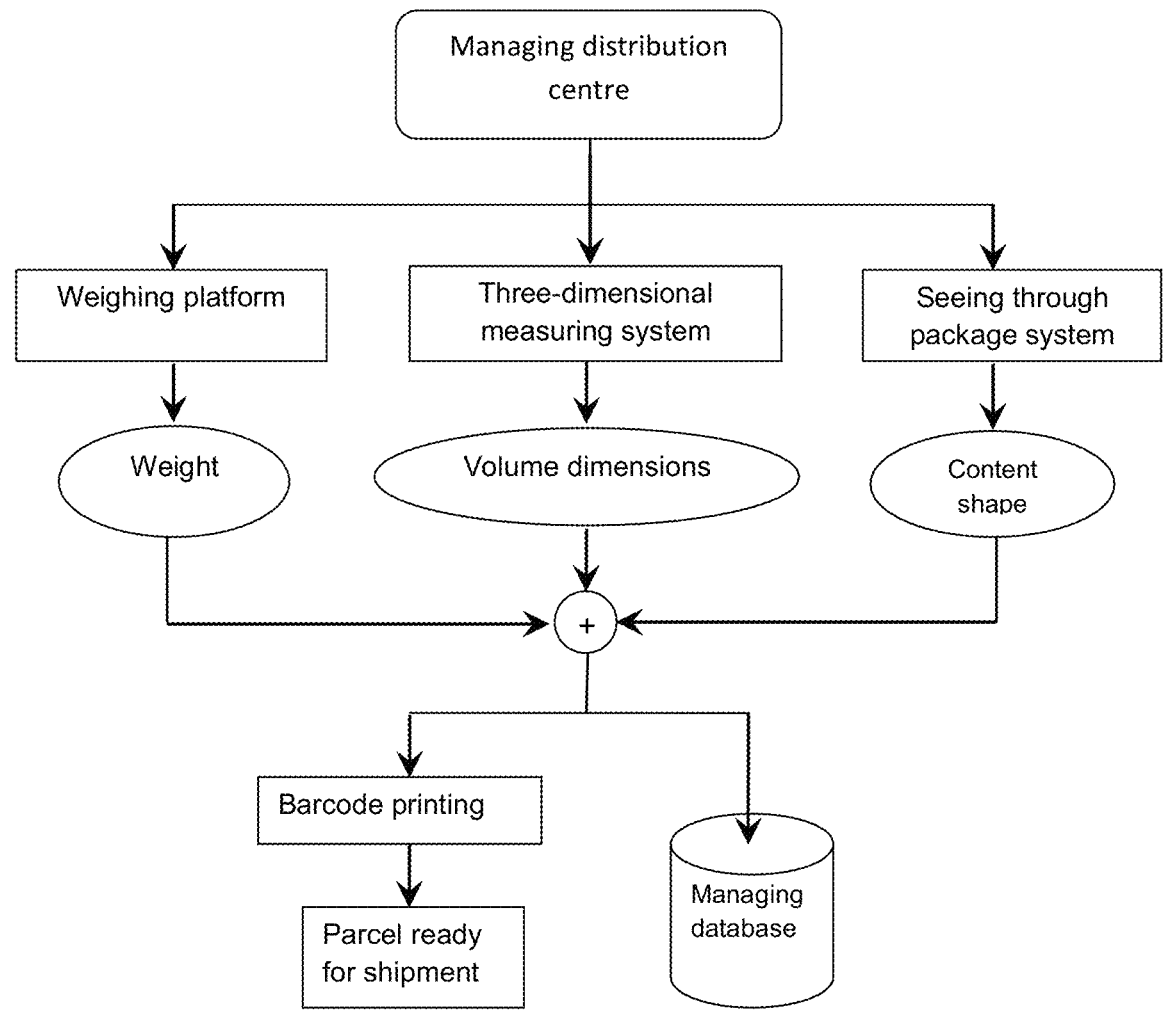

As shown on FIG. 7, the parcel is weighed at the managing distribution centre 22 where it is received from the sender. The dimensions of the parcel are also determined using a measuring system such as 3D scanning sensor or 2D sensor (CMOS or CCD) with/without a laser source combination.

The shape of the shipment content is also measured using "seeing through package technology" such as a combination of CMOS and a terahertz vision device that discerns a terahertz band of the electromagnetic spectrum.

Alternatively, at least part of this information is extracted from a database available in a sender computer and sent to the managing distribution centre prior to delivery of the shipment.

Notably, the shape of the shipment content can be extracted from a bank of pictures available in the sender computer 20. These pictures can be provided for instance by the manufacturer of the product contained in the shipment. In this case, various views of the content (e.g. from top, front, side) may be available.

The above specific information (weight, dimensions and shape) are linked to an identification code such as barcode and/or a RFID tag affixed to the packaging.

This information is recorded in the managing distribution database 22A of the managing distribution centre for various possible processing operations comprising, sending the information to the appropriate electronic locker unit where the parcel is expected, notifying the recipient and/or the sender, storage and archiving. Alternatively, the specific information can be recorded in a remote database distinct from the managing distribution database and accessible by the electronic locker unit.

Figure 8:
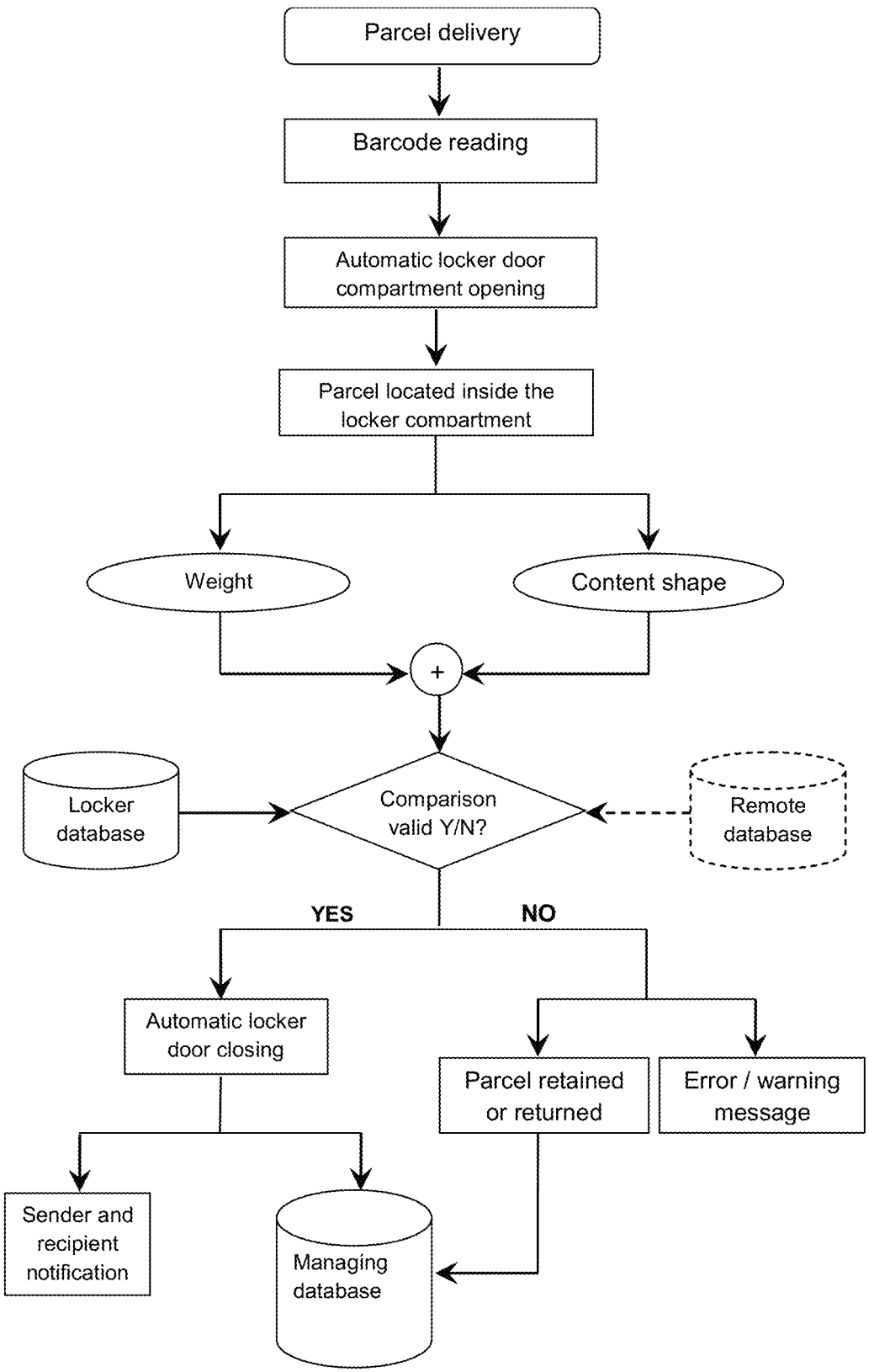

As depicted on FIG. 8, a delivery agent identifies himself/herself via e.g. a code at electronic locker unit 24 of secure locker system 2 into which he/she logs. For entering the identification code of the shipment and retrieving the specific information associated with the shipment, the delivery agent then scans the identification code 42 on parcel 40 causing the door of the appropriate locker compartment 28i to open according to the size and the weight of the shipment. Alternatively, the electronic locker unit automatically indicates to the delivery agent, in lighting at least a sign 29i, an appropriate compartment based on predefined preferences such as the closest available to the delivery agent. Preferably, when the shipment appears to be bulky or heavy, this sign can indicate the bottom of the electronic locker unit. After selection, the electronic locker unit automatically opens the appropriate compartment. The parcel is positioned inside the locker compartment where its weight and content's shape are measured with respective modules 50, 60. This information is sent to the locker unit database 24A for comparison and validation steps.

Particularly, if the compartment only comprises a shape measurement module 60, a close match and validation of the comparison of shipment content's shape is sufficient to securely close the compartment containing the shipment and logging the compartment as being filled and successfully closed. But if the compartment comprises a weighing module 50 and a shape measurement module 60, a close match and validation of the comparisons of the weight and of the shipment content's shape are necessary to securely close the compartment containing the shipment and log the compartment as being filled and successfully closed.

The managing distribution centre is automatically notified of the safe delivery of the shipment with an electronic message including the specific information. Optionally the sender 34 and the recipient 36 can be automatically notified directly, for instance on their portable phone 34A, 36A.

Otherwise, an error and/or warning message will pop up on the display of the electronic locker unit. Simultaneously, the managing distribution centre is notified. The parcel is either retained or returned to the managing distribution centre for further verification.

Additional modifications and improvements of the present invention may also be apparent to those of ordinary skill in the art. Thus, the particular combination of features described and illustrated herein is intended to represent only one embodiment of the present invention, and does not serve as a limitation of alternative devices within the spirit and scope of the invention.

For instance, in the delivery operating mode, if the compartment only comprises a weighing module 50, a close match and validation of the comparison of the weight is sufficient to securely close the compartment containing the shipment by the delivery agent 32 and logging the compartment as being filled and successfully closed.

In both operating modes, the acquired shipment content's shape could also be compared to hazardous items listed in a surveillance bank of pictures within the locker unit database (or remotely within the managing distribution database) for sending a warning message if at least one of such items is identifiable. In this case, the compartment can be locked and the shipment retained for further verification.

Moreover, the information (weight, dimensions and shape) can be downloaded into a mobile terminal 32A of the delivery agent when leaving the distribution center. The information is further transmitted to the electronic locker unit 24 along with the scanning of the identification code 42.

The invention claimed is:

1. A method for securely controlling mailing, deposition and retrieval of shipments into at least one electronic locker unit connected to a managing distribution center through a communication network and having several lockable compartments of different sizes, each shipment having three-dimensions and a weight, the method comprising:
   generating an identification code of the shipment and specific information associated with the shipment;
   unlocking by an electronic locker unit a compartment of said at least one electronic locker unit;
   receiving the shipment inside the compartment, the shipment which has at least one opaque exterior wall that delineates an interior cavity, the shipment containing a shipment content within the interior cavity;
   acquiring by the electronic locker unit, while the shipment is stationary in the compartment, a shape measurement of the shipment content through the opaque exterior wall with a shape measurement module located inside the compartment;
   comparing by the electronic locker unit the shape measurement of the shipment content with shape information of the shipment content, the shape information of the shipment content included within the specific information associated with the shipment;
   comparing by the electronic locker unit the shape measurement of the shipment content with shape information of a set of hazardous items; and
   as a result of determining that the shape measurement i) matches the shape information of the shipment content included within the specific information associated with the shipment, and ii) does not match the shape information of any of the set of hazardous items, locking and logging by the electronic locker unit the compartment containing the shipment as being successfully filled and the shipment as being ready for retrieval.

2. The method of claim 1, wherein the specific information includes the three dimensions of the shipment or the weight of the shipment.

3. The method according to claim 2, further comprising indicating to a sender at least one appropriate compartment according to the three dimensions or the weight of the shipment.

4. The method of claim 1, wherein the specific information is generated on a computer of the sender.

5. The method of claim 1, wherein the specific information is generated at a control desk of the electronic locker unit.

6. The method of claim 4, wherein the specific information is sent to a remote database accessible by the electronic locker unit.

7. The method of claim 1, further comprising measuring the dimensions of the shipment by a three-dimensional measuring device located within a control desk.

8. The method of claim 7, further comprising weighing the shipment at a built-in scale located within said control desk.

9. The method of claim 1, wherein the identification code is printed as a barcode or included in a radio frequency identification (RFID) tag which is affixed to the shipment.

10. The method of claim 1, further comprising securely paying postage and services fees for franking the shipment at a control desk of the electronic locker unit.

11. A method for securely controlling deposition and retrieval of shipments on at least one electronic locker unit connected to a managing distribution center through a communication network, and having several lockable compartments of different sizes, the method comprising:
   receiving by an electronic locker unit an identification code of the shipment and retrieving specific information associated with the shipment based on the identification code of the shipment;
   unlocking by the electronic locker unit a compartment of said at least one electronic locker unit;
   receiving the shipment inside the compartment, the shipment which has at least one opaque exterior wall that delineates an interior cavity, the interior cavity which contains a shipment content that has a shape;
   acquiring by the electronic locker unit, while the shipment is stationary in the compartment, a shape measurement of the shipment content through the opaque exterior wall of the shipment with a shape measurement module located inside the compartment and comparing in a processing module the shape measurement of the shipment content with shape information of the shipment content, the shape information of the shipment content included within the retrieved specific information;
   causing by the electronic locker unit the compartment containing the shipment to be locked; and
   logging by the electronic locker unit the compartment as being filled and locked upon close match and validation of comparison of the shape of the shipment content with the shape information included within the retrieved specific information.

12. The method of claim 11, further comprising notifying the managing distribution center of the safe deposition or retrieval of the shipment with an electronic message linked to the identification code of the shipment.

13. The method of claim 1, wherein the shape measurement of the shipment content is also compared to hazardous items listed in a surveillance bank of pictures, the compartment containing the shipment is locked and logged as being successfully filled and the shipment is logged as being ready for retrieval if no one of such hazardous items is identifiable.

14. The method of claim 13, wherein, if at least one of such hazardous items is identifiable, an error message is sent at a control desk of the electronic locker unit.

15. A hybrid system for securely controlling mailing, deposition and retrieval of shipments, each shipment which has at least one opaque exterior wall that delineates an interior cavity, the interior cavity which contains the shipment content, the hybrid system comprising:
   a managing distribution center; and
   at least one electronic locker unit connected to the managing distribution center through a communication network, and having a control desk and several lockable compartments of different sizes;
   wherein said at least one electronic locker unit comprises:
      a shape measurement module located inside each compartment for acquiring a shape measurement, while the shipment is stationary in a compartment, of a shipment content through the opaque exterior wall and
      at least one processor that: i) compares the acquired shape of the shipment content with shape information of the shipment content, the shape information of the shipment content included within a set of specific information, the set of specific information associated with the shipment via an identification code, and ii) that compares the acquired shape of the shipment content with hazardous items listed in a surveillance bank of images.

16. The hybrid system of claim 15, wherein said electronic locker unit further includes a weighing module inside each compartment for weighing the shipment, and a processing module that compares the measured weight with a corresponding recorded weight.

17. The hybrid system of claim 15, wherein said electronic locker unit further includes a three-dimensional measuring device located on said control desk for measuring the dimensions of the shipment.

18. The hybrid system of claim 15, wherein said electronic locker unit further includes a built-in scale located on said control desk for measuring a weight of the shipment.

19. The hybrid system of claim 15, wherein said shape measurement module comprises a terahertz vision device mounted on a ceiling of compartment for covering any shipment resting on an upper bearing plate.

20. The hybrid system of claim 15, wherein the managing distribution center is external to the at least one locker unit.

* * * * *